United States Patent [19]

Murakami et al.

[11] Patent Number: 5,335,708
[45] Date of Patent: Aug. 9, 1994

[54] COOLING APPARATUS AND TEMPERATURE CONTROL METHOD THEREFOR

[75] Inventors: Kyoshiro Murakami, Shimizu; Tetsuji Yamashita, Shizuoka; Tomio Yoshikawa, Shimizu; Hiromu Yasuda, Shizuoka; Shizuo Zushi, Hadano, all of Japan

[73] Assignee: Hitachi, Ltd., Tokyo, Japan

[21] Appl. No.: 953,769

[22] Filed: Sep. 30, 1992

Related U.S. Application Data

[63] Continuation of Ser. No. 558,514, Jul. 27, 1990, abandoned.

[30] Foreign Application Priority Data

Sep. 18, 1989 [JP] Japan .................. 1-239997

[51] Int. Cl.$^5$ .............. F28F 27/00; F28F 27/02; G05D 23/00
[52] U.S. Cl. .................... 165/1; 165/35; 165/36; 165/39; 165/40; 364/157; 364/165; 236/78 D
[58] Field of Search .......... 165/40, 39, 35, 36, 165/1; 364/157, 172, 183, 165; 236/78 D

[56] References Cited

U.S. PATENT DOCUMENTS

| | | | |
|---|---|---|---|
| 2,788,264 | 4/1957 | Bremer et al. | 165/35 |
| 2,948,295 | 8/1960 | Smith, Jr. | 236/78 D |
| 3,174,298 | 3/1965 | Kleiss | 364/172 |
| 3,645,697 | 2/1972 | Hoffman, Jr. | 165/36 |
| 3,738,609 | 6/1973 | Divigard | 236/78 D |
| 3,820,590 | 6/1974 | Littman et al. | 165/39 |
| 4,387,422 | 6/1983 | Steutermann | 364/172 |
| 4,495,777 | 1/1985 | Babington | 165/40 |
| 4,669,058 | 5/1987 | Schneider et al. | 364/157 |
| 4,702,306 | 10/1987 | Herzog | 165/40 |
| 4,737,531 | 4/1988 | Rogers | 165/36 |
| 4,993,480 | 2/1991 | Suzuki et al. | 165/32 |

FOREIGN PATENT DOCUMENTS

0076196 5/1984 Japan .................. 165/40

OTHER PUBLICATIONS

Uichi Inoue, "High-Temperature Water Heating" Air Conditioning and Sanitary Engineering Institute, published by Maruzen Co., Ltd. Jul. 30, 1968, pp. 80–81 FIGS. 5 and 7.

Anderson, Norman A., Instrumentation for Process Measurement and Control, Chilton Company 3rd edition pp. 352–355 1980.

Primary Examiner—John K. Ford
Attorney, Agent, or Firm—Antonelli, Terry, Stout & Kraus

[57] ABSTRACT

A cooling apparatus has a heat exchanger for performing heat exchange between cooling water and fluid, and a flow rate regulator valve for regulating a flow rate of either the cooling water or the fluid which pass through the heat exchanger. A cooling temperature of the fluid is preset. A temperature of the cooled fluid is detected, and an opening degree of the flow rate regulator valve is changed when there is a difference between the detected temperature and the preset temperature. Simultaneously, either a temperature difference of the cooling water and the fluid or a flow rate of the cooling water is detected. The opening degree of the flow rate regulator valve is corrected or compensated on the basis of a result of the detection, thus enabling suitable temperature control of the fluid in accordance with a variation of the temperature or flow rate of the cooling water.

6 Claims, 7 Drawing Sheets

COOLING APPARATUS AND TEMPERATURE CONTROL METHOD THEREFOR

This application is a continuation of application Ser. No. 558,514, filed Jul. 27, 1990 now abandoned.

BACKGROUND OF THE INVENTION

The present invention relates to a cooling apparatus for cooling a fluid by water through a heat exchanger and a temperature control method therefor. This cooling apparatus is suitable, not exclusively, for cooling a large-scale computer.

A conventional cooling apparatus of this type includes a heat exchanger for performing heat exchange between cooling water and a high-temperature fluid, and a flow rate regulator valve for regulating a flow rate of the fluid passing through the heat exchanger. Opening degree of the flow rate regulator valve is controlled in accordance with a difference between a temperature of the fluid after having been cooled and a preset temperature of the same. In the conventional art, however, control of the flow rate regulator valve is performed in a fixed manner regardless of the magnitude of a temperature or a flow rate of the cooling water. As a result, the temperature and the flow rate of the cooling water for performing required cooling are limited within certain ranges, and if the temperature or the flow rate of the cooling water is changed, the stability of temperature control of the fluid is deteriorated.

Such a conventional cooling apparatus is shown, for example, in the book entitled "High-Temperature Water Heating" (written by Uichi Inoue, edited by Air Conditioning and Sanitary Engineering Institute, published from Maruzen Co., Ltd. on Jul. 30, 1968), pp. 80–81, FIGS. 5 and 7.

SUMMARY OF THE INVENTION

It is an object of the present invention to provide a temperature control method capable of obtaining the fluid of a required temperature in a stable manner over wide ranges of a temperature and a flow rate of cooling water.

Another object of the invention is to provide a temperature control method which can perform stable temperature control in spite of variations of temperature or flow rate of the cooling water.

Still another object of the invention is to provide a cooling apparatus of a simple structure by which the above methods can be put into practice.

In order to attain the above-mentioned objects, the invention is featured in that, while a temperature of fluid is detected to determine an opening degree of a flow rate regulator valve in the same manner as the conventional method described previously, a temperature difference between cooling water and the fluid or a flow rate of the cooling water is simultaneously detected to set a sensitivity of the flow rate regulator valve, i.e., to correct or compensate the opening of the flow rate regulator valve in accordance with a result of the detection.

By detecting the temperature difference between the cooling water and the fluid and setting the sensitivity of the flow rate regulator valve in accordance with the detected temperature difference, different heat exchange quantity characteristics of the heat exchanger can be obtained in accordance with the detected temperature difference, thereby enabling stable temperature control. Alternatively, the flow rate of the cooling water is detected, and the flow rate regulator valve is controlled in accordance with the detected flow rate, so that different heat exchange quantity characteristics of the heat exchanger can be obtained in accordance with the detected flow rate of the cooling water, thus enabling stable temperature control.

According to the invention, therefore, the temperature of the fluid can stably be controlled over wide ranges of the temperature and the flow rate of the cooling water. Further, the stable temperature control of the fluid can be obtained in spite of a variation of the temperature or flow rate of the cooling water.

BRIEF DESCRIPTION OF THE DRAWINGS

The above and other objects, features, and advantages of the invention will be clearly understood from the following detailed description which will be made with reference to the accompanying drawings. In the drawings.

DESCRIPTION OF THE PREFERRED EMBODIMENTS

Figure 5:
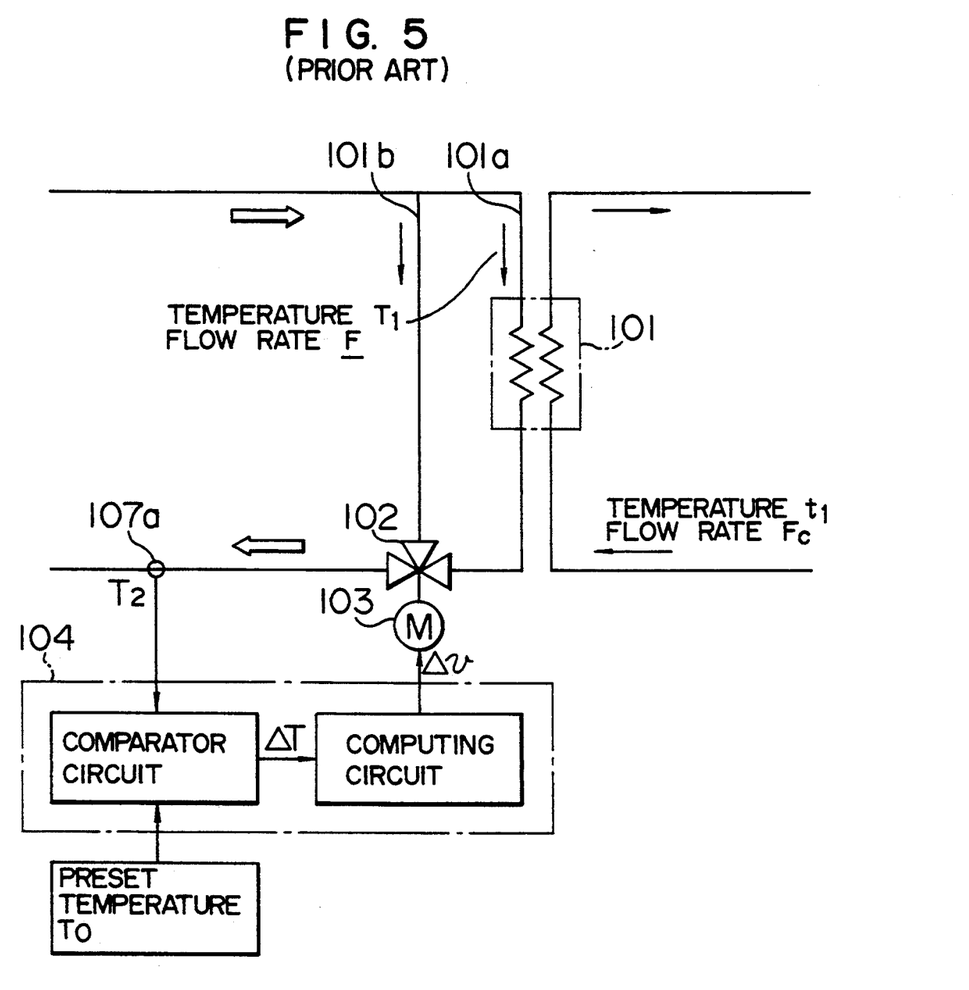
FIG. 5 is a schematic diagram of a cooling apparatus to which the invention is applicable.

At the outset, in order to facilitate understanding of the present invention, one example of a cooling apparatus to which the invention can be applied will be described with reference to FIG. 5.

The cooling apparatus illustrated includes a heat exchanger 101, a three-way valve 102, an electric motor 103 for opening/closing the three-way valve, and a control unit 104 for controlling the electric motor. A flow passage 101a for a cooling fluid is connected to the heat exchanger 101. Further, low temperature water for cooling the fluid is supplied to the heat exchanger 101 which is adapted to exchange heat between the fluid and the low-temperature water. City water, industrial water or the like can be used for the low-temperature water.

The flow passage 101a is provided to circulate the fluid between the heat exchanger and a load to be cooled, e.g., a computer or the like. After cooling the computer and the like, the fluid of a high temperature is led to the heat exchanger 101, cooled by the low-temperature water, and returned to the computer or the like again. A bypass flow passage 101b is provided in the flow passage 101a to bypass the heat exchanger 101. On the other hand, the three-way valve 102 is connected to the flow passage 101a on the downstream side of the heat exchanger, and is connected also to the bypass flow passage 101b. The three-way valve has a structure for regulating the flow rate of the fluid passing through the heat exchanger 101 by changing rates of the fluid flowing in the flow passages 101a and 101b, thereby controlling the temperature of the fluid.

The electric motor 103 is connected to the three-way valve 102 for driving it, and the control unit 104 is electrically connected to the electric motor 103. Further, a temperature sensor 107a is installed within the flow passage 101a at the downstream side of the three-way valve so as to detect a temperature $T_2$ of the fluid flowing toward the computer or the like. The temperature sensor 107a is connected to the control unit 104 for inputting thereinto the temperature of the fluid thus detected.

The control unit 104, which includes a comparator circuit and a computing circuit, is designed such that a preset temperature $T_0$ of the fluid is input thereto. In the comparator circuit, the temperature $T_2$ detected by the temperature sensor 107a is compared with the preset temperature $T_0$, and when these temperatures have a difference $\Delta T$, the difference is output to the computing circuit. In the computing circuit, an opening variation $\Delta v$ of the three-way valve 102 is computed in accordance with the temperature difference $\Delta T$, so that the three-way valve 102 is operated by the electric motor 103. As a result, a flow rate F of the fluid passing through the heat exchanger 101 is regulated, and the fluid temperature $T_2$ is controlled. In this cooling apparatus, the opening degree of the flow rate regulator valve for a required heat exchange quantity is preset on the assumption that the temperature and the flow rate of the low-temperature water supplied for cooling, such as city water, industrial water or the like, are substantially constant.

Subsequently, the temperature control in the above-described cooling apparatus will be explained with reference to FIGS. 6 and 7.

Figure 6:
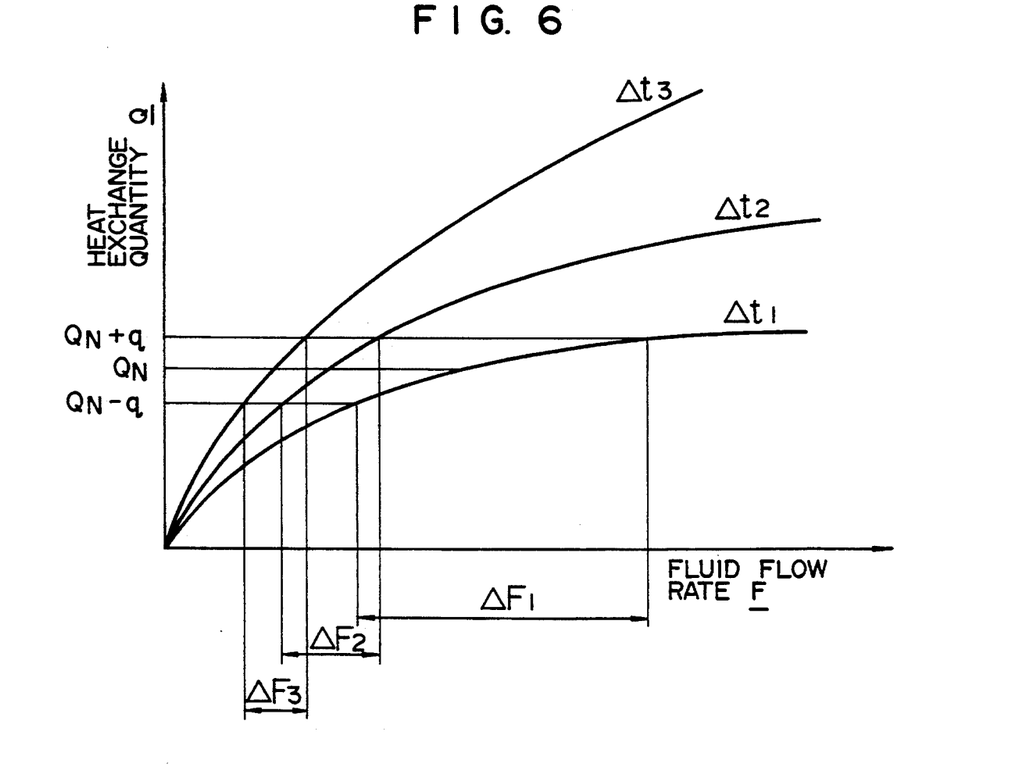
FIGS. 6 and 7 are graphs illustrating characteristics of heat exchange capability of the cooling apparatus shown in FIG. 5.
Figure 7:
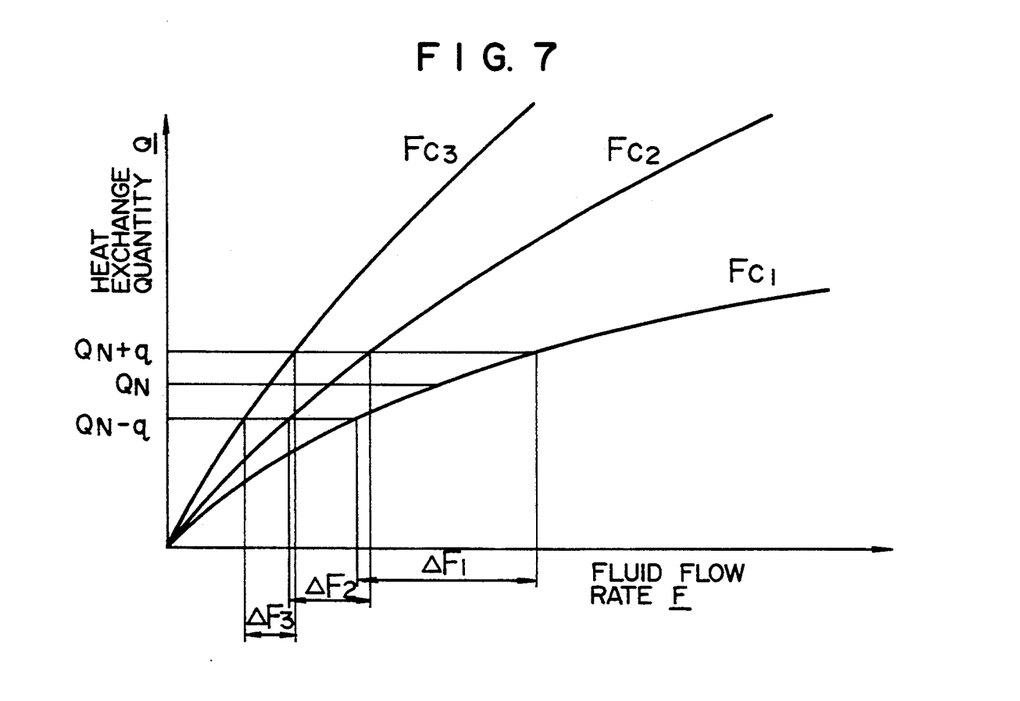

FIGS. 6 and 7 respectively illustrate the relations between the flow rate F of the fluid passing through the heat exchanger and the heat exchange quantity Q of the heat exchanger. In FIG. 6, a temperature $T_1$ of the fluid at the inlet of the heat exchanger and a flow rate Fc of the cooling water are assumed to be constant, and a difference $\Delta t$ between the fluid temperature $T_1$ and a temperature $t_1$ of the cooling water at the inlet of the heat exchanger is a parameter. In this graph, a case of $\Delta t_2$ assumed in the apparatus shown in FIG. 5 and two other cases of $\Delta t_1$ and $\Delta t_3$ ($\Delta t_3 > \Delta t_2 > \Delta t_1$) are shown as examples. On the other hand, in FIG. 7, the temperature $T_1$ of the fluid and the temperature $t_1$ of the cooling water are assumed to be constant, and the flow rate Fc of the cooling water is a parameter. Likewise in this graph, a case of $Fc_2$ assumed in the conventional apparatus and two other cases of $Fc_1$ and $Fc_3$ ($Fc_3 > Fc_2 > Fc_1$) are shown as examples.

As illustrated in FIG. 6, the flow rate regulation range of the fluid for letting the heat exchange quantity fall within a permissible range from $(Q_N+q)$ to $(Q_N-q)$ of a required heat exchange quantity $Q_N$ is $\Delta F_1$ in the case of $\Delta t_1$ and $\Delta F_3$ in the case of $\Delta t_3$. The required heat exchange quantity referred to herein is a quantity of heat exchange necessary for cooling the fluid down to a certain preset temperature. In the above-described cooling apparatus, however, the flow rate regulation range $\Delta F$ with respect to a variation q of the heat exchange quantity Q is set to $\Delta F_2$ regardless of the temperature of the cooling water. As a result, when the actual temperature of the cooling water is lower or higher than the predetermined temperature as in the case of $\Delta t_1$ or $\Delta t_3$, the required flow rate regulation range comes to be different from the predetermined one. That is to say, $\Delta F_2$ is smaller than $\Delta F_1$ in the case of $\Delta t_1$, $\Delta F_2$ is larger than $\Delta F_3$ in the case of $\Delta t_3$. This results in a problem that stable control cannot be performed with respect to the required heat exchange quantity.

Similarly, as illustrated in FIG. 7, if the flow rate regulation range is set to be $\Delta F_2$ with respect to the permissible heat exchange quantity range $(Q_N+q)$ to $(Q_N-q)$, $\Delta F_2$ is smaller than $\Delta F_1$ when the flow rate of the cooling water is $Fc_1$, and $\Delta F_2$ is larger than $\Delta F_3$ when it is $Fc_3$. This also give rise to the same problem that the flow rate regulation cannot be stably performed with respect to the required heat exchange quantity.

The present invention has been accomplished in view of these problems, and is intended to solve the problems in such a manner that the temperature of the fluid after having been cooled is detected to determine an opening degree of the flow rate regulator valve, as described above, and that the difference between the temperature of the cooling water and that of the fluid, or the flow rate of the cooling water is detected to control the flow rate regulation valve in accordance with the result of the detection.

The cooling apparatuses according to various embodiments of one aspect of the invention will now be described with reference to FIGS. 1 to 4.

Figure 1:
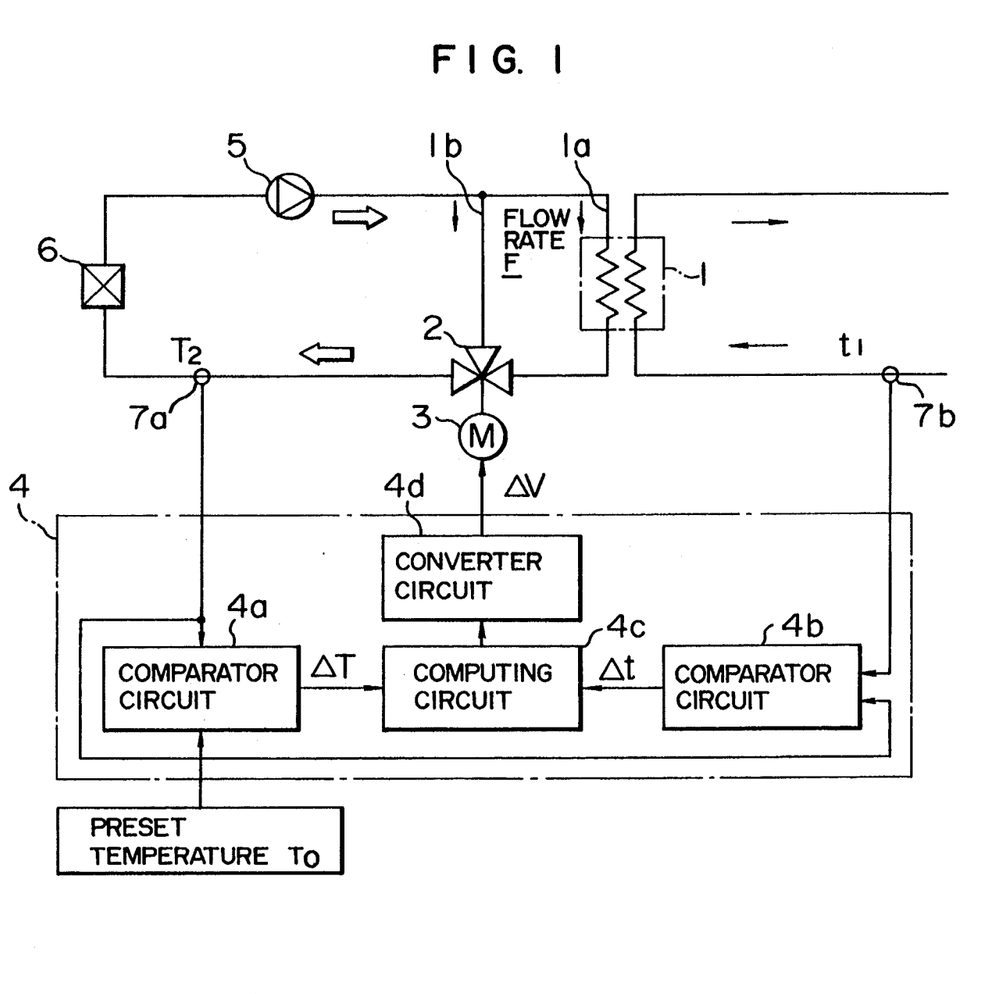
FIG. 1 is a schematic diagram showing the cooling apparatus according to an embodiment of one aspect of the invention.

Referring to FIG. 1, the cooling apparatus according to the first embodiment includes a heat exchanger 1 to which low-temperature water is adapted to be supplied. The heat exchanger 1 communicates with a load 6 to be cooled through a flow passage in which a pump 5 is provided upstream of heat exchanger 1 thus forming a cooling fluid cycle. In the fluid passage 1a, a three-way valve 2 and a bypass flow passage 1b are provided, an electric motor 3 is connected to the three-way valve 2, and a control unit 4 is connected to the electric motor 3. In order to control a temperature $T_2$ of the fluid, the three-way valve 2 controls a flow rate F of the fluid passing through the heat exchanger 1. The apparatus of this embodiment may be of substantially the same structure as that of the apparatus shown in FIG. 5 except for the control unit 4, and therefore detailed explanation of its structure and operation will be omitted.

In the same manner as the cooling apparatus described previously, a sensor 7a for detecting the temperature of the fluid is installed in the flow passage 1a and connected to the control unit 4. Further, a sensor 7b is installed in a flow passage for leading the low-temperature water to the heat exchanger 1 to detect a temperature $t_1$ of the cooling water. The temperature sensor 7b is also connected to the control unit 4.

The control unit 4 has two comparator circuits 4a and 4b, a computing circuit 4c, and a converter circuit 4d. The comparator circuit 4a calculates a difference $\Delta T$ between a preset temperature $T_0$ of the fluid and its actual temperature $T_2$ in the same manner as the apparatus shown in FIG. 5. On the other hand, the comparator circuit 4b calculates a difference $\Delta t$ between the temperature $T_2$ of the fluid and the temperature $t_1$ of the cooling water. The results of the calculation by these comparator circuits are input to the computing circuit 4c where a required valve opening variation $\Delta V$ is computed in accordance with the temperature differences $\Delta T$ and $\Delta t$. More particularly, the opening degree of the flow rate regulator valve is determined in accordance with the temperature difference $\Delta T$ in the same manner as the conventional apparatus, and simultaneously, this opening degree is corrected or compensated in accordance with a change of the cooling water temperature to set the sensitivity of the valve. The result of this computation is output to the electric motor 3 through the converter circuit 4d. Consequently, according to the cooling apparatus of this embodiment, stable temperature control can be performed over a wide range of the cooling water temperature $t_1$, and also, the temperature control can be reliably carried out in response to a change of the cooling water temperature $t_1$.

Figure 8:
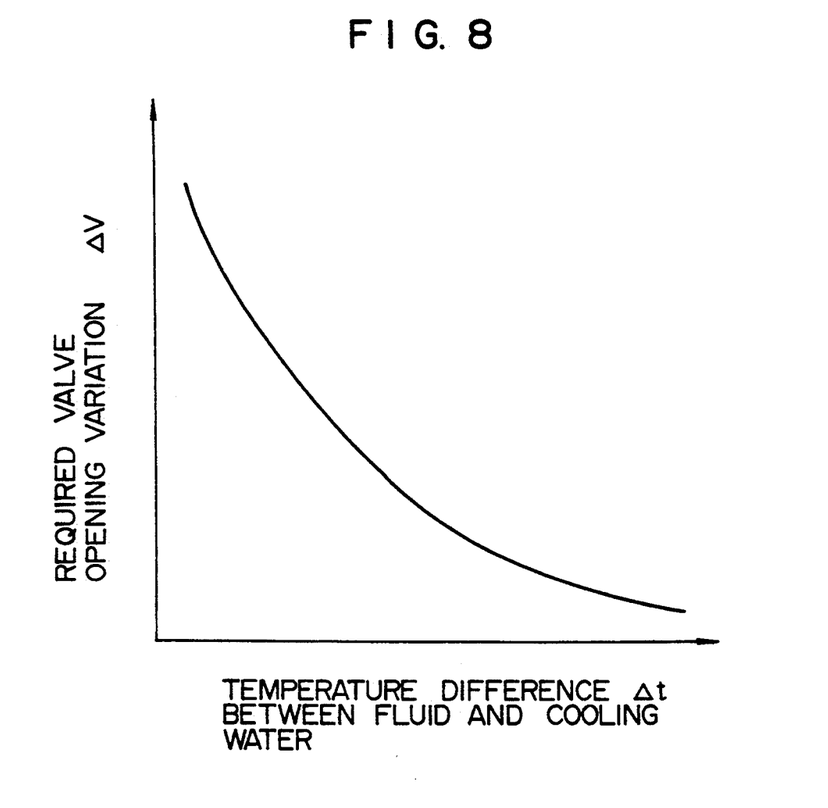
FIGS. 8 and 9 are graphs illustrating characteristics of valve opening compensation of a flow rate regulator valve in the cooling apparatus according to the invention.

FIG. 8 illustrates the relation between the sensitivity of the flow rate regulator valve, i.e., the valve opening variation $\Delta V$ with respect to the control range of a required heat exchange quantity, and the temperature difference $\Delta t$ between the fluid and the cooling water in this embodiment.

Figure 2:
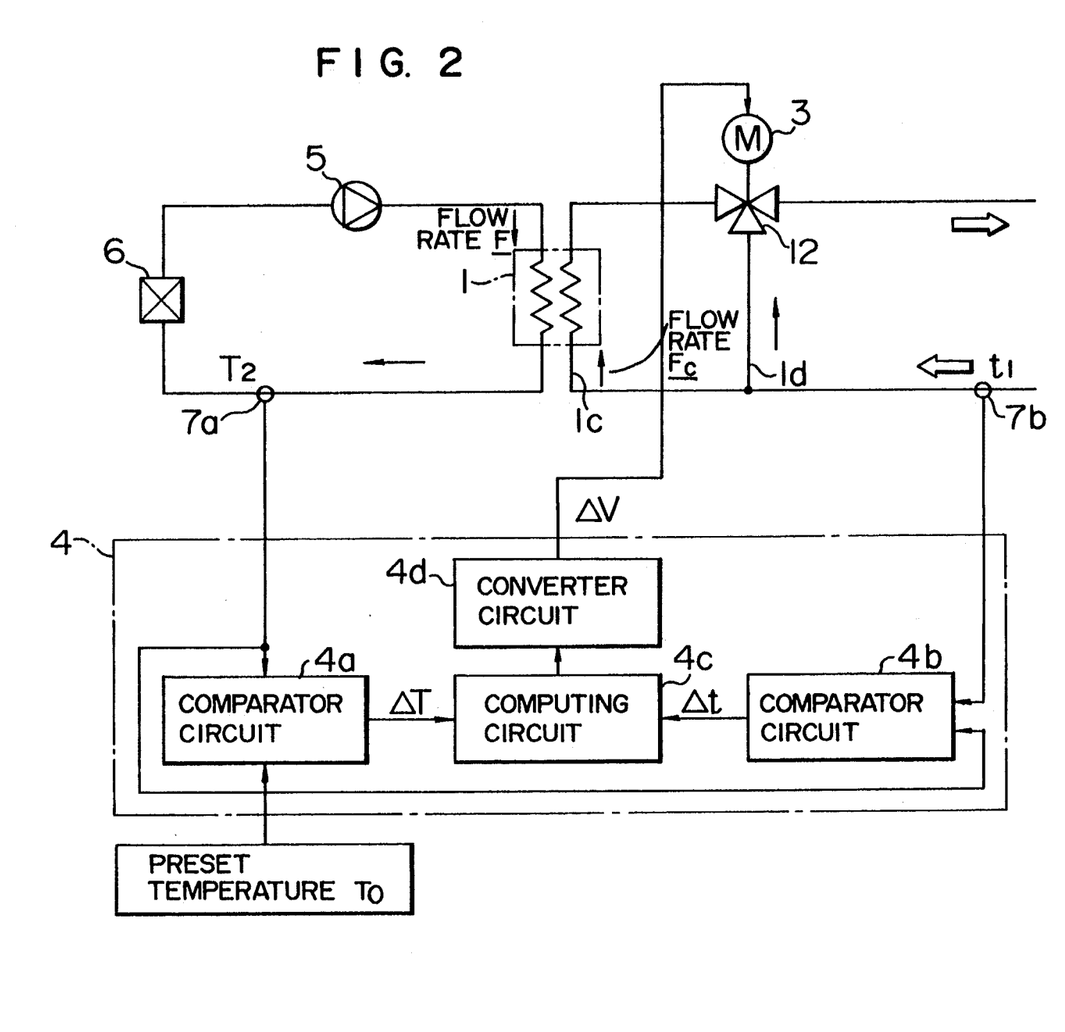
FIGS. 2 to 4 are schematic diagrams respectively showing the cooling apparatuses according to different embodiments of the one aspect of the invention.

FIG. 2 shows the cooling apparatus according to another embodiment of the one aspect of the invention. In this embodiment, a three-way valve 12 is disposed in a cooling water flow passage 1c on the downstream side of a heat exchanger. Further, in place of the bypass flow passage 1b in the above-described embodiment, a bypass flow passage 1d is provided in the flow passage 1c. The rest of the structure of this embodiment is the same as that of the first embodiment. Incidentally, in further embodiments which will be described below, the same component parts as those of the first embodiment are denoted by the same reference numerals and explanation thereof will be omitted.

In operation of the cooling apparatus, the three-way valve 12 changes rates of the cooling water passing through the heat exchanger and that bypassing the same so as to control the heat exchange quantity. The remaining operation of this embodiment is the same as that of the first embodiment, thereby providing the same effect as the first embodiment.

Figure 3:
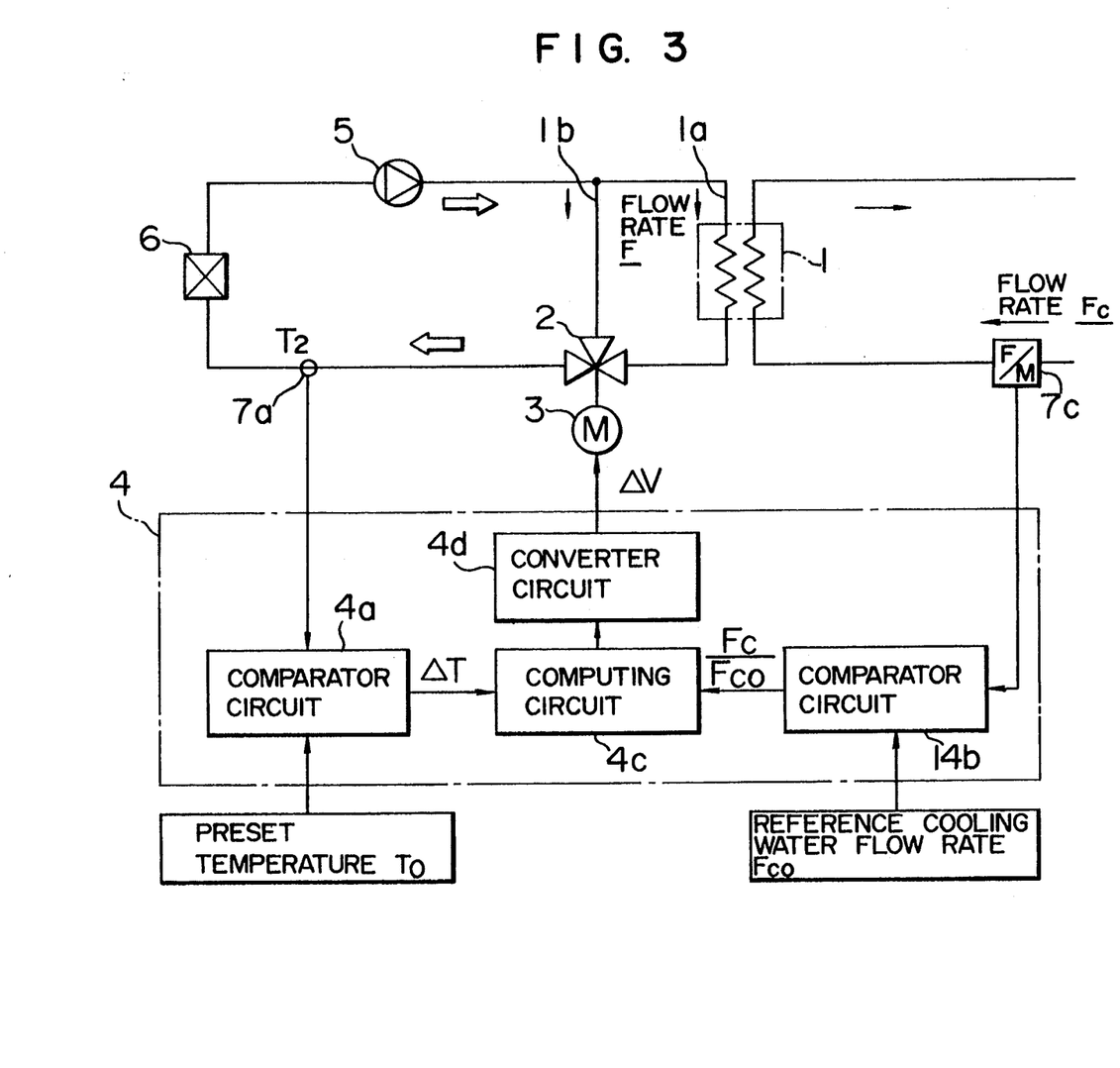

The cooling apparatus according to still another embodiment of the one aspect of the invention is shown in FIG. 3. In this embodiment, instead of the detection of the cooling water temperature in the first embodiment, the flow rate of the cooling water is detected by a flow meter 7c which is installed in a flow passage of the cooling water. Further, in place of the comparator circuit 4b in the first embodiment, a comparator circuit 14b is provided in this embodiment, and the flow meter 7c is connected to the comparator circuit 14b. The comparator circuit 14b is adapted to have a reference flow rate Fco of the cooling water also input thereto. The comparator circuit 14b calculates a ratio of a detected flow rate Fc of the cooling water to the reference flow rate Fco. Then the computing circuit 4c calculates a required valve opening $\Delta V$ in accordance with the proportion Fc/Fco, and outputs the same to the electric motor 3. In this embodiment, the opening degree of the flow rate regulator valve is determined in accordance with the temperature difference $\Delta T$, and simultaneously, this opening degree is compensated in accordance with a change of the cooling water flow rate so as to determine the sensitivity of the valve. According to this embodiment, stable temperature control can be performed over a wide range of the cooling water flow rate Fc, and also, the temperature control can be reliably carried out in response to a change of the cooling water flow rate Fc.

Figure 9:
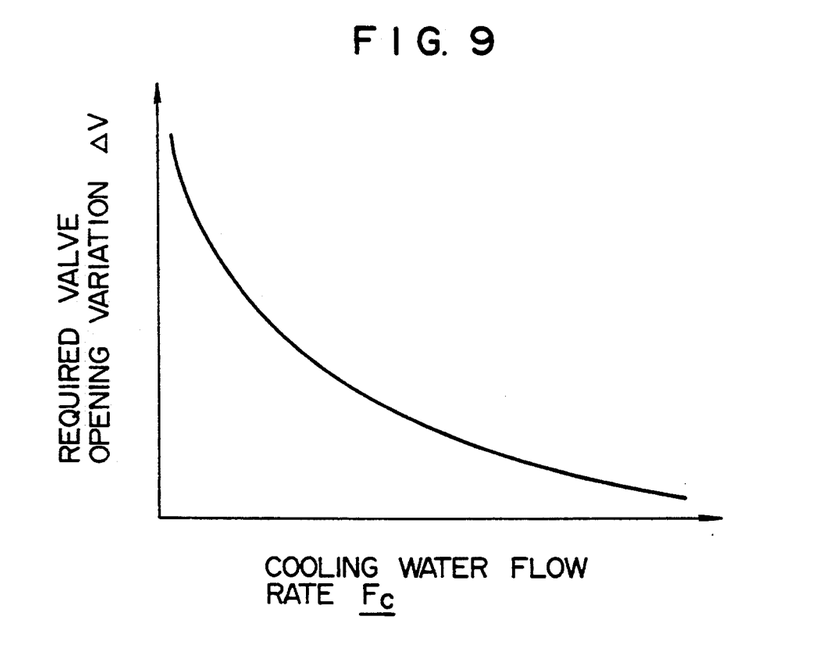

FIG. 9 illustrates the relation between the sensitivity of the flow rate regulator valve, i.e., the valve opening variation $\Delta V$ with respect to the control range of a required heat exchange quantity, and the flow rate Fc of the cooling water in this embodiment.

Figure 4:
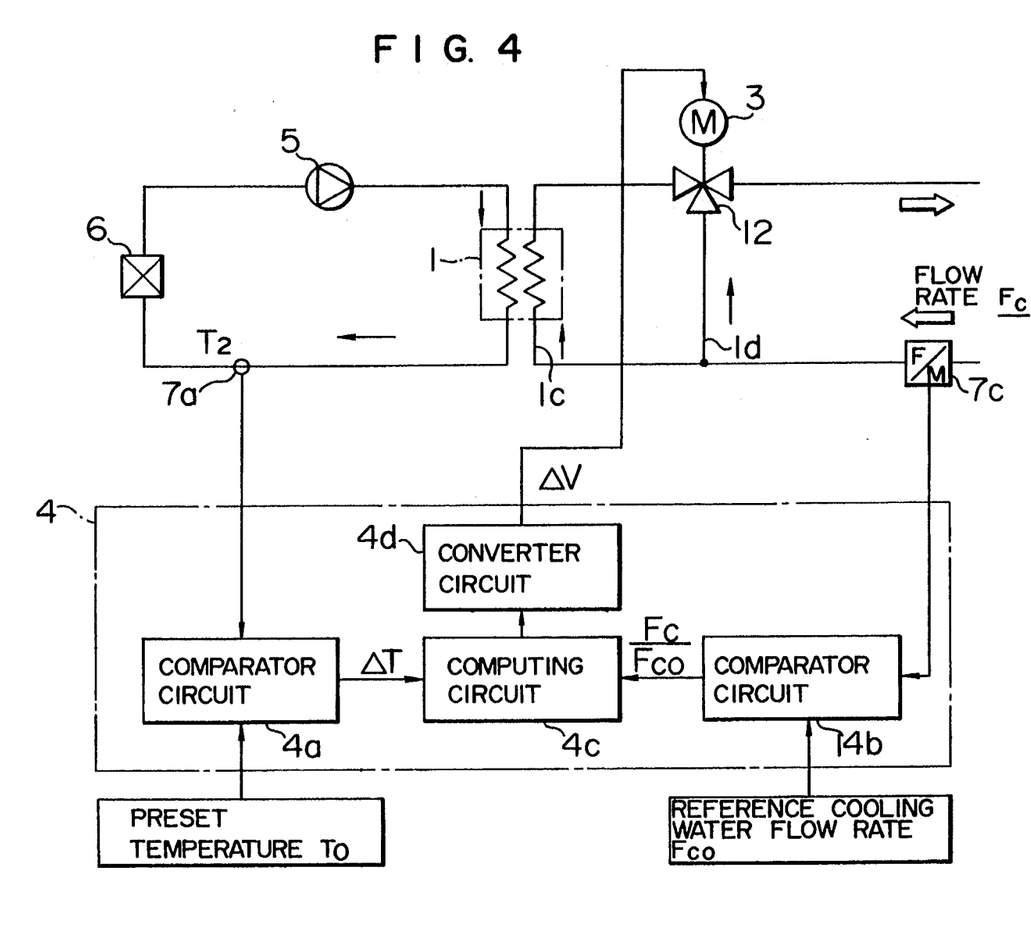

The cooling apparatus according to still another embodiment of the one aspect of the invention is shown in FIG. 4. In this embodiment, the three-way valve 12 is disposed in the cooling water flow passage 1c in the same manner as the second embodiment, and the flow meter 7c is installed in the flow passage 1c in the same manner as the third embodiment. This embodiment achieves the same effect as the third embodiment.

Although the present invention has been described on the basis of the embodiments illustrated in the accompanying drawings, it should be appreciated that the invention is not limited solely to these specific embodiments, and that various modifications may be made to the specific forms or the invention may be embodied in other forms within the scope of the appended claims.

What is claimed is:

1. A method of controlling a temperature of fluid to be cooled by a cooling apparatus, said cooling apparatus including a heat exchanger for performing heat exchange between cooling water and said fluid, and a flow rate regulator valve for regulating a flow rate of one of said cooling water and said fluid passing through said heat exchanger, wherein said method comprises the steps of:

presetting a cooling temperature of said fluid; and
determining an opening degree of said flow rate regulator valve, said determining an opening degree being effected in accordance with:
(i) detecting a temperature difference between that of cooled fluid and the preset temperature, and
(ii) simultaneously with step (i) detecting a temperature difference between said cooling water and said fluid so as to effect automatic control of the setting of the sensitivity of said flow rate regulator valve,
whereby temperature control of said fluid is provided through control of said flow rate regulator valve, determined according to step (i), as compensated through controlling of the sensitivity of said flow rate regulator valve according to step (ii).

2. The method according to claim 1, wherein said flow rate regulator valve regulates the flow rate of said fluid passing through said heat exchanger.

3. The method according to claim 2, wherein control of the setting of the sensitivity of said flow rate regulator valve is effected through determining said temperature difference of said cooling water and said fluid by sensing a temperature of said cooling water before entering said heat exchanger and a temperature of said fluid after passing through said heat exchanger.

4. The method according to claim 1, wherein control of the setting of the sensitivity of said flow rate regulator valve is effected through determining said temperature difference of said cooling water and said fluid by sensing a temperature of said cooling water before entering said heat exchanger and a temperature of said fluid after passing through said heat exchanger.

5. A cooling apparatus for cooling fluid by cooling water, comprising:

a heat exchanger for performing heat exchange between said cooling water and said fluid;
a flow rate regulator valve for regulating a flow rate of one of said cooling water and said fluid passing through said heat exchanger;
first means for presetting a cooling temperature of said fluid;
second means for detecting a temperature of the cooled fluid and determining an opening degree of said flow rate regulator valve when there is a difference between the detected temperature and the preset temperature; and third means for controlling the setting of the sensitivity of said flow rate regulator valve by detecting a temperature difference between said cooling water and said fluid, whereby compensation of the opening degree, determined by said second means, of said flow rate regulator valve is effected prior to actual control thereof and is in accordance with the setting of the sensitivity of said flow rate regulator valve as determined by said third means.

6. The apparatus according to claim 5, wherein said flow rate regulator valve is provided on a downstream side of said heat exchanger to regulate the flow rate of said fluid passing through said heat exchanger, and control of the setting of the sensitivity of said flow rate regulator valve is effected through determining said temperature difference of said cooling water before entering said heat exchanger and a temperature of said fluid after passing through said heat exchanger.

* * * * *